US007176782B2

(12) United States Patent
Shitan

(10) Patent No.: US 7,176,782 B2
(45) Date of Patent: Feb. 13, 2007

(54) ELECTRONIC LOCKING SYSTEM, LOCKING MANAGEMENT DEVICE, METHOD OF MANAGING A LOCKING DEVICE, AND PROGRAM

(75) Inventor: Yasuhiro Shitan, Kanagawa (JP)

(73) Assignee: Konami Sports Life Corporation, Tokyo (JP)

( * ) Notice: Subject to any disclaimer, the term of this patent is extended or adjusted under 35 U.S.C. 154(b) by 218 days.

(21) Appl. No.: 10/946,064

(22) Filed: Sep. 22, 2004

(65) Prior Publication Data

US 2005/0040931 A1 Feb. 24, 2005

Related U.S. Application Data

(63) Continuation of application No. PCT/JP03/03799, filed on Mar. 27, 2003.

(30) Foreign Application Priority Data

Mar. 27, 2002 (JP) ............................ 2002-089360

(51) Int. Cl.

| | |
|---|---|
| ***G05B 19/00*** | (2006.01) |
| ***G06F 7/00*** | (2006.01) |
| ***G06K 19/00*** | (2006.01) |
| ***H04B 1/00*** | (2006.01) |
| ***H04L 9/14*** | (2006.01) |

(52) U.S. Cl. ........................ 340/5.22; 340/5.2; 340/5.5

(58) Field of Classification Search ................. 340/5.2, 340/5.5–5.73, 545; 349/825.31; 312/329, 312/219–220; 235/382.5; 7/540, 84; 700/17, 700/90

See application file for complete search history.

(56) References Cited

U.S. PATENT DOCUMENTS 5,345,379 A * 9/1994 Brous et al. .................. 700/17

(Continued)

FOREIGN PATENT DOCUMENTS

JP S54-31396 A 3/1979

(Continued)

OTHER PUBLICATIONS

Notice of rejection for JP2002-089360, which is JP counterpart to present US application.

*Primary Examiner*—Wendy R. Garber
*Assistant Examiner*—Nam Nguyen
(74) *Attorney, Agent, or Firm*—Shinjyu Global IP

(57) ABSTRACT

An electronic locking device is disclosed which, when applied to rental lockers, will allow electronic data to be delivered without causing inconvenience to a user. One who desires to use a locker will approach an input device while in possession of a recording device. The input device will detect the approach of the recording device without coming into contact therewith, and will output data indicating the detection thereof to a management device. The management device will extract the locker IDs of the lockers that are not currently being used, and will display the unused lockers on the input device. When a user inputs the selection of a locker and a password into the input device, the locker ID of the selected locker and the password will be output to the management device. The management device will set the electronic data, i.e., the electronic key, for opening the selected locker, wirelessly output the electronic key to the recording device via the input device, and the selected locker will be unlocked. The recording device will store the received electronic key.

25 Claims, 20 Drawing Sheets

U.S. PATENT DOCUMENTS

| | | | | |
|---|---|---|---|---|
| 6,323,782 | B1 * | 11/2001 | Stephens et al. | 340/10.31 |
| 6,456,900 | B1 * | 9/2002 | Kakuta | 700/233 |
| 6,825,753 | B2 * | 11/2004 | Cardinale et al. | 340/5.73 |
| 6,895,241 | B2 * | 5/2005 | Hara | 455/420 |
| 6,999,825 | B2 * | 2/2006 | Inomata | 700/90 |
| 2003/0025589 | A1 | 2/2003 | Koike | |

FOREIGN PATENT DOCUMENTS

| | | | |
|---|---|---|---|
| JP | A-S58-120972 | | 7/1983 |
| JP | S63-236197 | A | 10/1988 |
| JP | A-H04-167094 | | 6/1992 |
| JP | A-H05-141139 | | 6/1993 |
| JP | H05-141139 | A | 6/1993 |
| JP | H05-287946 | A | 11/1993 |
| JP | A-H06-12540 | | 1/1994 |
| JP | H06-012540 | A | 1/1994 |
| JP | A-H07-224560 | | 8/1995 |
| JP | A-H07194823 | | 8/1995 |
| JP | H09-317278 | A | 12/1997 |
| JP | 2001-020574 | A | 1/2001 |
| JP | A-2001-020574 | | 1/2001 |
| JP | A-2001-040919 | | 2/2001 |
| JP | 2001-175904 | A | 6/2001 |
| JP | 2001-349112 | A | 12/2001 |
| JP | 2003-051815 | A | 2/2003 |
| JP | A-2003-51815 | | 2/2003 |

* cited by examiner

662

| Locker ID | × × × × | Electronic key | △△△△ | Password | □□□□ |
|---|---|---|---|---|---|

| User ID | Use began | Use completed |
|---|---|---|
| 0002 | 2002, 1, 15, 18:15 | |
| 0001 | 2002, 1, 15, 9:05 | 2002, 1, 15, 12:08 |
| 0003 | 2002, 1, 13, 20:00 | 2002, 1, 13, 21:58 |
| ⋮ | ⋮ | ⋮ |

...

*Fig. 8*

664

| | | | | | |
|---|---|---|---|---|---|
| Detection unit ID | × × × × | Location | Studio 1 | Number of persons | 13 |

| User ID | Entrance time | Departure time |
|---|---|---|
| 0003 | 19:15 | 20:15 |
| 0005 | 19:13 | — |
| 0011 | 19:11 | — |
| ⋮ | ⋮ | ⋮ |

...

*Fig. 19*

ELECTRONIC LOCKING SYSTEM, LOCKING MANAGEMENT DEVICE, METHOD OF MANAGING A LOCKING DEVICE, AND PROGRAM

CROSS-REFERENCE TO RELATED APPLICATIONS

This application is a continuation of International Application No. PCT/JP03/03799, filed on Mar. 27, 2003, and claims priority to Japanese Patent Application No. 2002-89360, filed on Mar. 27, 2002, both of which are incorporated herein by reference in their entireties.

BACKGROUND OF THE INVENTION

1. Field of the Invention

The present invention relates to an electronic locking system which provides both user convenience and the safety of a locking device, a locking management device, a method of managing a locking device, and a program.

2. Background Information

Rental lockers for general use are now common in places such as changing rooms and train stations. With rental lockers, there will be times in which a user thereof will lose the locker key. When this occurs, the safety of the locker may be compromised because a third party may find the key.

In response to this, electronic locking devices which are opened by means of electronic data have appeared in recent years. With this locking device, the electronic data can be changed even if, for example, a storage medium on which a user has stored electronic data for unlocking the lock is lost. Thus, the safety of the locking device can be maintained.

However, in the event that the electronic locking device noted above is applied to a rental locker, there will be a need to provide electronic data to a user without making the user feel that this is inconvenient.

Accordingly, an object of the present invention is to solve this type of problem.

SUMMARY OF THE INVENTION

In order to achieve the aforementioned object, according to a first aspect of the present invention, an electronic locking system is provided that includes a locking device that is unlocked by inputting electronic data therein, a portable recording device that externally receives and stores the electronic data, a recording device detection unit that detects the recording device without coming into contact therewith, a setting unit that sets electronic data that is to be transmitted to the recording device detected by the recording device detection unit, and a transmission unit that wirelessly transmits the electronic data set by the setting unit to the recording device.

With this electronic locking system, the setting unit may set electronic data to be transmitted to the recording device on the condition that the recording device detection unit has detected the storage unit. Here, the electronic locking system may manage a plurality of locking devices, and may further comprise a storage unit that associates electronic data set by the setting unit with the locking device that is unlocked with the electronic data and stores the same.

The electronic locking system may manage a plurality of locking devices, and may further include a storage unit that respectively associates a plurality of electronic data with the plurality of locking devices and stores the same. The setting unit may set the electronic data to be transmitted from the recording device by selecting one of the locking devices and electronic data that corresponds to that one locking device. Here, the electronic system may further include a data modification unit that will modify at least one portion of the electronic data that is stored in the storage unit every predetermined period of time.

The electronic locking system may further include a storage unit that stores the electronic data transmitted by the transmission unit, an unlock receiving unit that receives the electronic data that is stored in the recording device when the locking device is to be unlocked, and a command unit that outputs an unlock command to the locking device and causes the locking device to unlock on the condition that the electronic data received by the unlock receiving unit matches the electronic data stored in the storage unit. In addition, the electronic locking system may further include a setting receiving unit that receives user identification data that identifies the user from other users, in which the storage unit stores the user identification data received by the setting receiving unit, the unlock receiving unit receives and associates the user identification data input in order to unlock the locking device with the electronic data, and the command unit outputs the unlock command on condition that there is a match between both the user identification data and the electronic data received by the unlock receiving unit. In these situations, the storage device may further store the history of the user identification data for the locking device.

In addition, in the former situation, the electronic locking system may include a setting receiving unit that receives a password for the locking device and which is set by a user. The storage unit may store the password received by the setting receiving unit, the unlock receiving unit may receive and associates the password input in order to unlock the locking device with the electronic data, and the command unit may output the unlock command on condition that there is a match between both the password and the electronic data received by the unlock receiving unit. In this situation as well, the setting receiving unit may receive user identification data that identifies the user from other users, and the storage unit may further store the user identification data received by the setting receiving unit. In this situation as well, the unlock receiving unit may further receive the password input in order to unlock the locking device and the electronic data, as well as the user identification data, and the command unit may output an unlock command to the locking device on condition that the user identification data, the password, and the electronic data received by the open lock receiving unit all match the data stored in the storage unit.

The recording device detection unit and the transmission unit may be arranged in a location that is near where the locking devices are located.

In addition, the electronic locking system may further include a command unit that will output an unlock command to the locking device, and cause the locking device to unlock on condition that the transmission unit has transmitted the electronic data.

Furthermore, the electronic locking system may further include a command unit that will output an unlock command to the locking device, and cause the locking device to open at a predetermined timing.

In addition, the electronic locking system may have a plurality of recording device detection units that are disposed in mutually different locations, in which each of the recording device detection units output detection unit identification data that identifies one recording device detection unit from other recording device detection units when the recording device is detected. The electronic locking system may further include a storage unit that stores data that specifies, for each recording device detection unit, the number of detection unit identification data output by the recording device detection units.

Here, each recording device detection unit may be disposed in entrances of mutually different facilities, and the recording device detection unit may output data that identifies the recording device together with the detection unit identification data, so as to cause data indicating that the user that is in possession of the recording device has passed through an entrance of a facility in which the recording device detection unit is disposed to be stored in the storage unit. In the event that data that identifies a new recording device is output from one of the recording device detection units, the storage unit will determine that a new user has entered the facility, will store and associate the data identifying the recording device with the detection unit identification data, and will store the time at which the recording device detection unit has output the detection unit identification data as the user's entrance time. In the event that data that identifies a previously stored recording device is output by the recording device detection unit, the storage unit will determine that the user has departed the facility, and will store and associate the time at which the recording device detection unit has output the detection unit identification data with the data identifying the previously stored recording device, and store the time as the time at which the user has departed the facility.

In addition, at least one of the recording device detection units may receive from the recording device both the detection unit identification data and the recording device identification data that specifies the recording device, and the storage unit may store, for each recording device detection unit, the recording device identification data as data that specifies the number of recording devices that were output. In this situation as well, the recording device identification data may be deleted when the storage unit receives a set of previously stored detection unit identification data and the recording device identification data. In this situation as well, The electronic locking device may further include a tabulation unit that tabulates the number of recording device identification data associated with one detection unit identification data.

Furthermore, the electronic locking system may manage a plurality of locking devices currently in use, and the setting unit may extract the unused locking devices, and set the locking device to be assigned to the recording device, on condition that the recording device detection unit has detected the recording device.

A second aspect of the present invention provides a portable recording device for unlocking a locking device, the recording device including a transmission unit that wirelessly transmits data indicating the presence of the recording device to an exterior of the recording device, a receiving unit that receives electronic data for unlocking the locking device that is wirelessly transmitted from the exterior thereof in response to data transmitted by the transmission unit, an electronic data storage unit that stores the received electronic data, and an unlocking unit that outputs the electronic data to the locking device in order to unlock the locking device.

In the second aspect, a mounting unit for mounting the recording device on a user's body may be further included. In addition, the recording device may further include an identification data storage unit that stores user identification data that identifies the user of the recording device, and the transmission unit may transmit the user identification data as data which indicates the presence of the recording device.

A third aspect of the present invention provides a locking management device that manages a plurality of locking devices that will unlock by inputting electronic data, the locking management device including a command unit that, at a predetermined timing, transmits an unlock command to each locking device and unlocks the locking devices.

Furthermore, the locking management device may further include a setting receiving unit that receives presence data indicating the presence of a user that will use the locking device, and an output unit that selects one locking unit to be assigned to the user, and outputs electronic data corresponding to the one locking device, on condition that the receiving unit received presence data.

A fourth aspect of the present invention provides a locking management device that manages a locking device that will unlock by inputting electronic data, the locking management device including a storage unit that stores the electronic data, a notification unit that outputs the electronic data in order to notify a user of the locking device, and a setting receiving unit that receives a password set by the user, wherein the storage unit further stores the password received by the setting receiving unit, and the locking management device further includes an unlock receiving unit that associates the password with the electronic data and receives the same, and a command unit that transmits an unlock command to the locking device and unlocks the locking device, on condition that the unlock receiving unit has associated the password with the electronic data and received the same.

In the fourth aspect, the notification device may output the electronic data on condition that the setting receiving unit has received the password.

The electronic data may be output on condition that the setting receiving unit received user identification data that identifies the user from other users.

The storage unit may further store the history of the user identification data in the unlocking device.

A fifth aspect of the present invention provides a locking management device that manages a locking device that is unlocked by inputting electronic data, the locking management device including a setting receiving unit that receives from a plurality of detection units that detect a portable recording device that receives and stores electronic data from the exterior of the recording device, both detection unit identification data that identifies the recording device detection units, and data indicating that the recording device has been detected, a setting unit that sets the electronic data to be transmitted to the recording device when the setting receiving unit has received both predetermined detection unit identification data and the recording device detection data, an output unit that outputs the electronic data set by the setting unit to the exterior of the locking management device in order to be stored in the recording device, a detection receiving unit that receives from at least one of the recording device detection units, recording device identification data that identifies the recording device, and the detection unit identification data that indicates the at least one recording device detection unit, and a storage unit that associates and stores the recording device identification data received by the detection receiving unit with the recording device detection unit.

In the fifth aspect, the electronic data may be deleted when the storage unit received the electronic data previously associated with the at least one detection unit identification data. In addition, the electronic locking device may further include a tabulation unit that tabulates the number of electronic data associated with one detection unit identification data.

A sixth aspect of the present invention provides an electronic locking system that manages a locking device that will be unlocked by inputting electronic data, the electronic locking system including a portable recording device that wirelessly receives and stores the electronic data from the exterior of the recording device, and outputs the electronic data to the locking device in order to unlock the locking device, a recording device detection unit that detects the recording device, a setting unit that sets the electronic data that is to be transmitted to the recording device detected by the recording device detection unit, and a transmission unit that wirelessly transmits the electronic data set by the setting unit to the recording device.

A seventh aspect of the present invention provides an electronic locking system that manages a locking device that will be unlocked by inputting electronic data, the electronic locking system including the locking device, a portable recording device that wirelessly receives and stores the electronic data from the exterior of the recording device, and outputs the electronic data to the locking device in order to unlock the locking device, a recording device detection unit that detects the recording device, a setting unit that sets the electronic data that is to be transmitted to the recording device detected by the recording device detection unit, and a transmission unit that wirelessly transmits the electronic data set by the setting unit to the recording device.

An eighth aspect of the present invention provides a method of managing a plurality of locking devices that are unlocked by inputting mutually different electronic data, the method comprising the steps of placing a user who desires to use the locking device in possession of a portable recording device that wirelessly receives and stores the electronic data from the exterior of the recording device, having a computer set the locking device to be assigned to the user when the computer has detected that the recording device has passed by a location near where the user will go when going to the locking devices, and having the computer wirelessly transmit and store the electronic data for unlocking the set locking device to the recording device.

In the eighth aspect, there may be a plurality of recording devices, the recording devices may be caused to transmit recording device identification data that identifies the recording devices to the computer, in the event that the recording devices pass by a predetermined location, the computer may be caused to receive and manage the transmitted recording device identification data, the computer may be caused to add up the number of the recording device identification data received, and the computer may be caused to calculate, in the event that any of the recording device identification data transmitted is already being managed by the computer, the number of users that have passed by the predetermined location by subtracting the number of the recording device identification data that are already being managed by the computer.

A ninth aspect of the present invention provides a computer executable program for managing a plurality of locking devices that are unlocked by inputting electronic data, the program including a selection module in the computer that, at a predetermined timing, transmits an unlock command to each locking device to unlock the locking devices.

A tenth aspect of the present invention is a computer executable program for managing a locking device that is unlocked by inputting electronic data, the program causing the computer to read out the electronic data and output the same in order to notify a user of the locking device, receive from the locking device a password input by the user of the locking device, store the received password, associate the password with the electronic data and receive the same, and transmit an unlock command to the locking device to unlock each locking device, on condition that the password is associated with the electronic data and received.

An eleventh aspect of the present invention provides a computer executable program for managing a locking device that is unlocked by inputting electronic data, the program causing the computer to receive from a plurality of recording device detection units that detect a portable recording device that receives and stores electronic data from the exterior of the recording device, both detection unit identification data that identifies the recording device detection units, and data indicating that the recording device has been detected, set the electronic data to be transmitted to the recording device when the setting receiving unit has received both predetermined detection unit identification data and the recording device detection data, output the set electronic data to the exterior thereof in order to be stored in the recording device, receive from at least one of the recording device detection units, recording device identification data that identifies the recording device, and the detection unit identification data that indicates the at least one recording device detection unit, and associate and store the received recording device identification data with the recording device detection unit.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 8 is a table showing a sample configuration of data from a setting database.

FIG. 19 is a table that show an example of the data configuration of the detection device database.

DETAILED DESCRIPTION OF THE PREFERRED EMBODIMENTS

Embodiments of the present invention will be described below with reference to the figures.

1. First Embodiment

Figure 1:
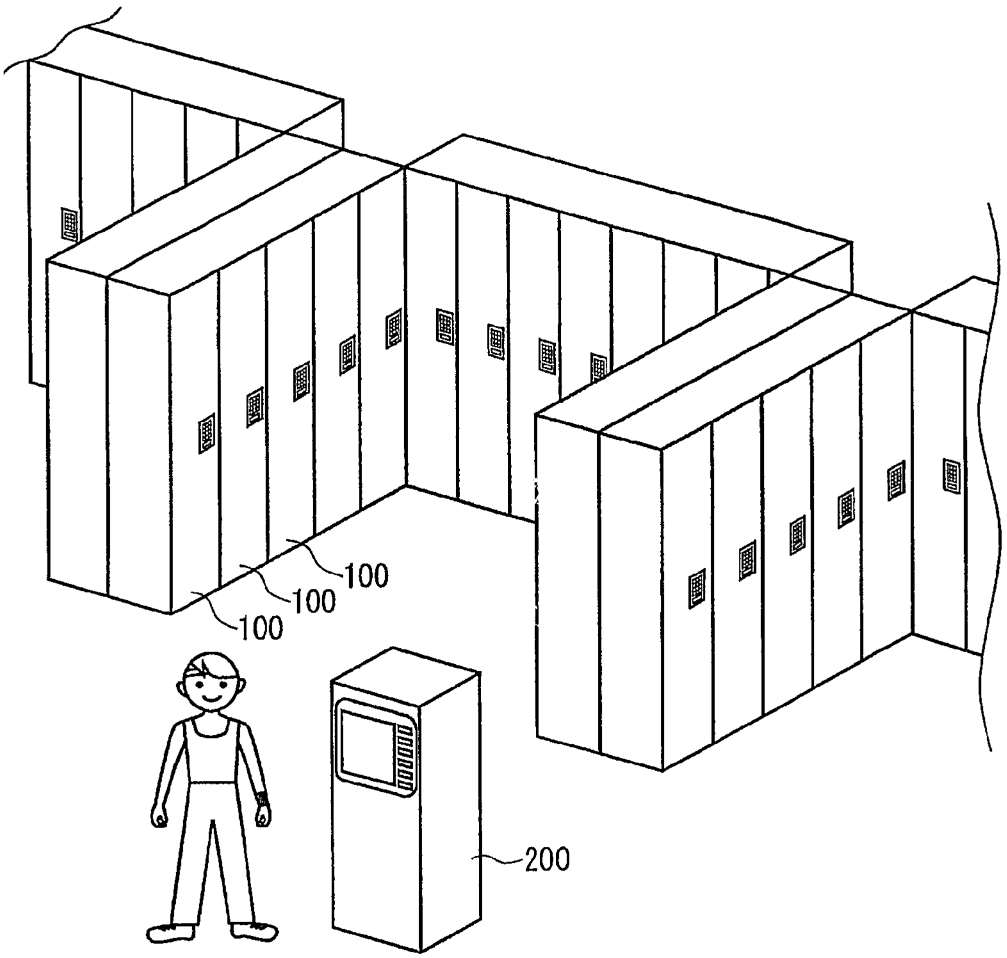
FIG. 1 shows an example of an electronic locking system according to a first embodiment of the present invention.

FIG. 1 shows an example of the usage of an electronic locking system according to a first embodiment of the present invention. In this embodiment, the electronic locking system includes a plurality of lockers 100, an input device 200, a portable recording device 400, and a management device. The input device 200 is used both as a detection unit and a transmission unit in the present invention, and is, for example, arranged in the approximate center of an approximately C-shaped, U-shaped, or L-shaped locker room that is formed by the plurality of lockers 100, and in a location that a user can access. In other words, the input device 200 is arranged in a location in which a recording device 400 carried by a user can wirelessly communicate therewith when the user enters or leaves the locker room. A user ID that identifies the user is pre-stored in the recording device 400. The user ID functions as recording device identification data that identifies the recording device 400.

The user of a locker 100 will approach the input device 200 while holding the recording device 400. The input device 200 will detect the approach of the recording device 400 without coming into contact therewith, and will output data indicating the detection thereof to the management device. The management device will extract the locker ID of an unused locker 100, and will display this on the input device 200. When a user inputs the selection of a locker 100 and a password into the input device 200, the locker ID and the password of the selected locker 100 will be output to the management device. The management device will establish electronic data, i.e., an electronic key, for unlocking the selected locker 100, wirelessly output the electronic key to the recording device 400 via the input device 200, and the selected locker 100 will unlock. The recording device 400 will store the received electronic key.

In addition, in order to reopen a locked locker 100, the user will input the password. When this occurs, the recording device 400 will wirelessly transmit the electronic key to the management device. The management device will output an instruction to open the locker 100 if the combination of the electronic key and the password match.

Thus by using this electronic locking system, a user can approach the lockers 100 (i.e., the input device 200), select a locker 100, and store an electronic key in the recording device 400 to unlock the selected locker by simply inputting a password. In addition, when the locker is to be unlocked, there will be no need for the user to perform an operation to transmit the electronic key.

Figure 2:
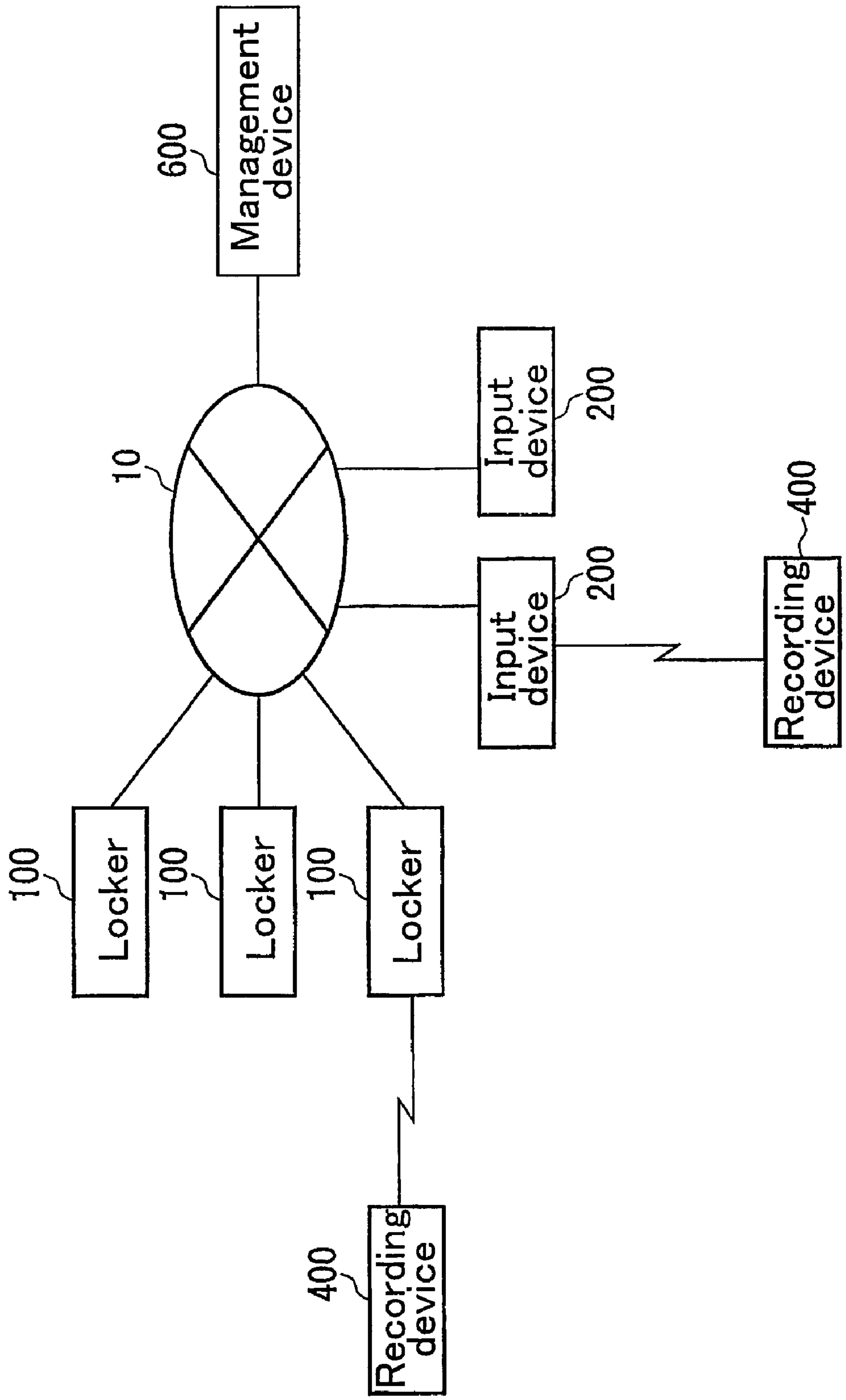
FIG. 2 is a block diagram that shows the configuration of the electronic locking system according to the first embodiment.

FIG. 2 shows an example of the configuration of the electronic locking system of the present embodiment. This configuration includes the plurality of lockers 100, the input device 200, and a management device 600 connected to a communications network 10 such as a LAN (local area network), as well as the portable recording device 400. The recording device 400 wirelessly communicates with the lockers 100 and the input device 200, i.e., the recording device 400 does not come into contact therewith. The communications network 10 is preferably a closed system.

Figure 3:
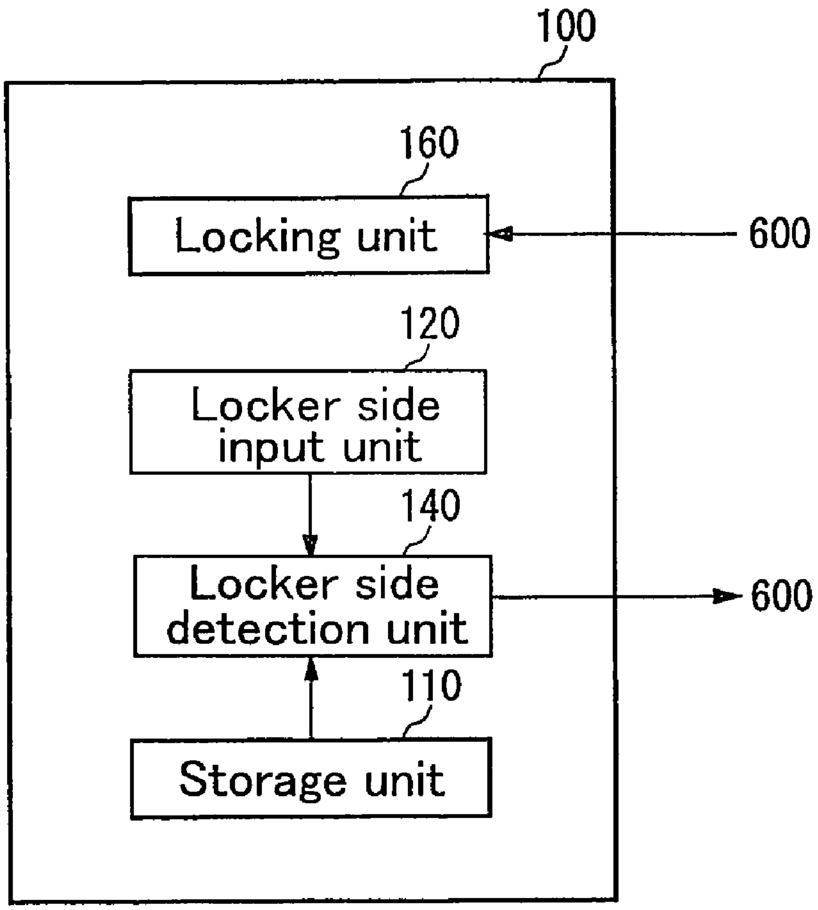
FIG. 3 is a block diagram that shows the configuration of a locker.

FIG. 3 shows an example of the configuration of a locker 100 of the present embodiment. In this embodiment, the locker 100 includes a storage unit 110, a locker side input unit 120, a locker side detection unit 140, and a locking unit 160.

The storage unit 110 stores the locker ID, which is data that serves to identify one locker from the other lockers 100.

The locker side input unit 120 is a unit in which a user will input a password. The locker side input unit 120 outputs the password acquired from the user to the locker side detection unit 140.

The locker side detection unit 140 outputs an electronic key transmission command to the recording device 400. When the recording device 400 responds to the transmission command and transmits the electronic key, the locker side detection unit 140 will receive the electronic key. Next, the locker side detection unit 140 will read the locker ID from the storage unit 110. Then, the locker ID read from the storage unit 110, the received electronic key, and the password received from the locker side input unit 120 will be associated with each other, and transmitted to the management device 600 via the communications network 10.

The locking unit 160 is a locking device that will lock the locker 100. The locking unit 160 will receive an unlock command from the management device 600 via the communications network 10. Then, the locker 100 will open based upon the received unlock command.

Figure 4:
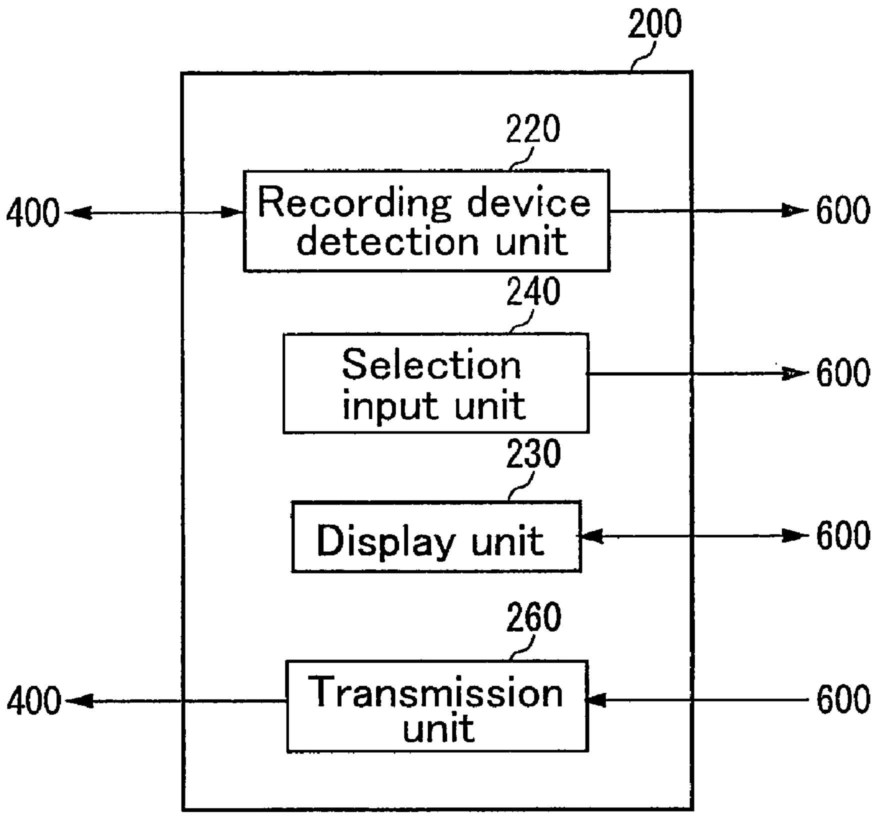
FIG. 4 is a block diagram that shows the configuration of an input device.

FIG. 4 shows an example of the configuration of the input device 200 of the present embodiment. In the present embodiment, the input device 200 includes a recording device detection unit 220, a selection input unit 240, and a transmission unit 260.

The recording device detection unit 220 detects the storage unit 400 without coming into contact therewith. In other words, the recording device detection unit 220 outputs a user ID transmission command to the recording device 400. Then, when the recording device 400 responds to the transmission command and transmits the user ID stored therein, the user ID received by the input device 200 will be transmitted to the management device 600 via the communications network 10, which will indicate that the recording device 400 was detected.

When the locker IDs of unused lockers are received from the management device 600, the display unit 230 will display data showing the lockers that correspond to the received locker IDs in a way that allows a user to identify them.

The selection input unit 240 is a unit in which a user will input data. The data that a user will input includes data indicating the locker selected from amongst the lockers displayed on the display unit 230, and the password set by the user. Then, the selection input unit 240 will transmit the locker ID of the locker selected by the user and the password to the management device 600 via the communications network 10. Here, the portion of the selection input unit 240 that the user will use to input the data indicating the selected locker may be a touch panel that is integrated with the display unit 230.

When the electronic key is received from the management device 600, the transmission unit 260 will wirelessly transmit the received electronic key to the recording device 400.

Figure 5:
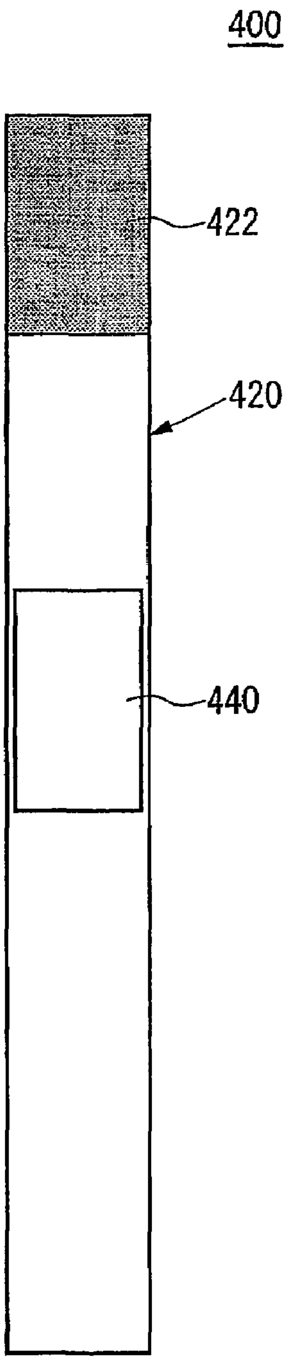
FIG. 5 is a plan view of a recording device.

FIG. 5 shows a plan view of the recording device 400. The recording device 400 includes a mounting unit 420 that allows the recording device 400 to be mounted on a user's body, and an IC 440 that serves to record, transmit, and receive data. The mounting unit 420 is, for example, a wrist band that can be wrapped around a wrist by means of a removable adhesive portion 422 (such as Magic Tape or the like).

Because the recording device 400 includes the mounting unit 420, a user will not be conscious of its presence even when exercising. In addition, there will be little possibility that a user will lose the recording device 400 during exercise.

Figure 6:
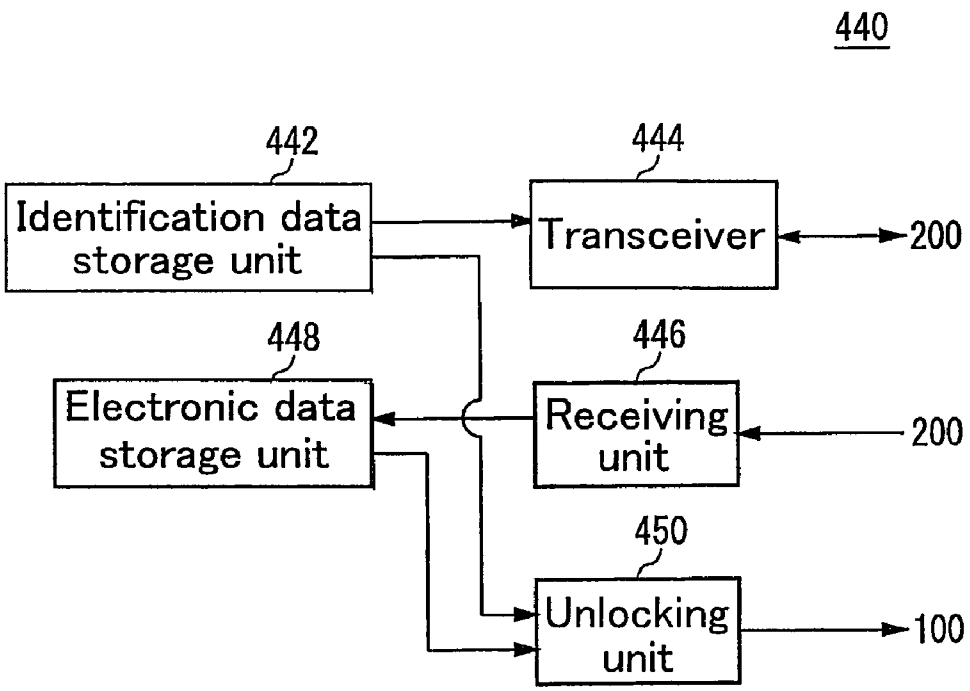
FIG. 6 is a block diagram showing an example of the configuration of an IC.

FIG. 6 shows an example of the configuration of the IC 440 of the present embodiment. In this embodiment, the IC 440 includes an identification data storage unit 442, a transceiver 444, a receiving unit 446, an electronic data storage unit 448, and a unlocking unit 450. The transceiver 444 is one example of a transmission unit.

The identification data storage unit 442 stores a user ID as data that will identify the recording device 400. The identification data storage unit 442 is preferably configured to allow data to be externally written thereto and deleted therefrom. This allows the recording device 400 to be collected from one user and then given to another user.

When a user ID transmission command is received from the input device 200, the transceiver 444 will read out the user ID from the identification data storage unit 442, and will wirelessly transmit the user ID to the input device 200.

The receiver 446 receives the electronic key from the input device 200, and outputs the electronic key to the electronic key storage unit 448.

The electronic key storage unit 448 stores the electronic key received from the receiver 446. The electronic data storage unit 448 is preferably configured to allow data to be externally written thereto and deleted therefrom. This allows the recording device 400 to be collected from one user and then given to another user.

When a transmission command is received from the locker 100, the unlocking unit 450 reads out the electronic key from the electronic data storage unit 448, and wirelessly transmits the electronic key to the locker 100.

Figure 7:
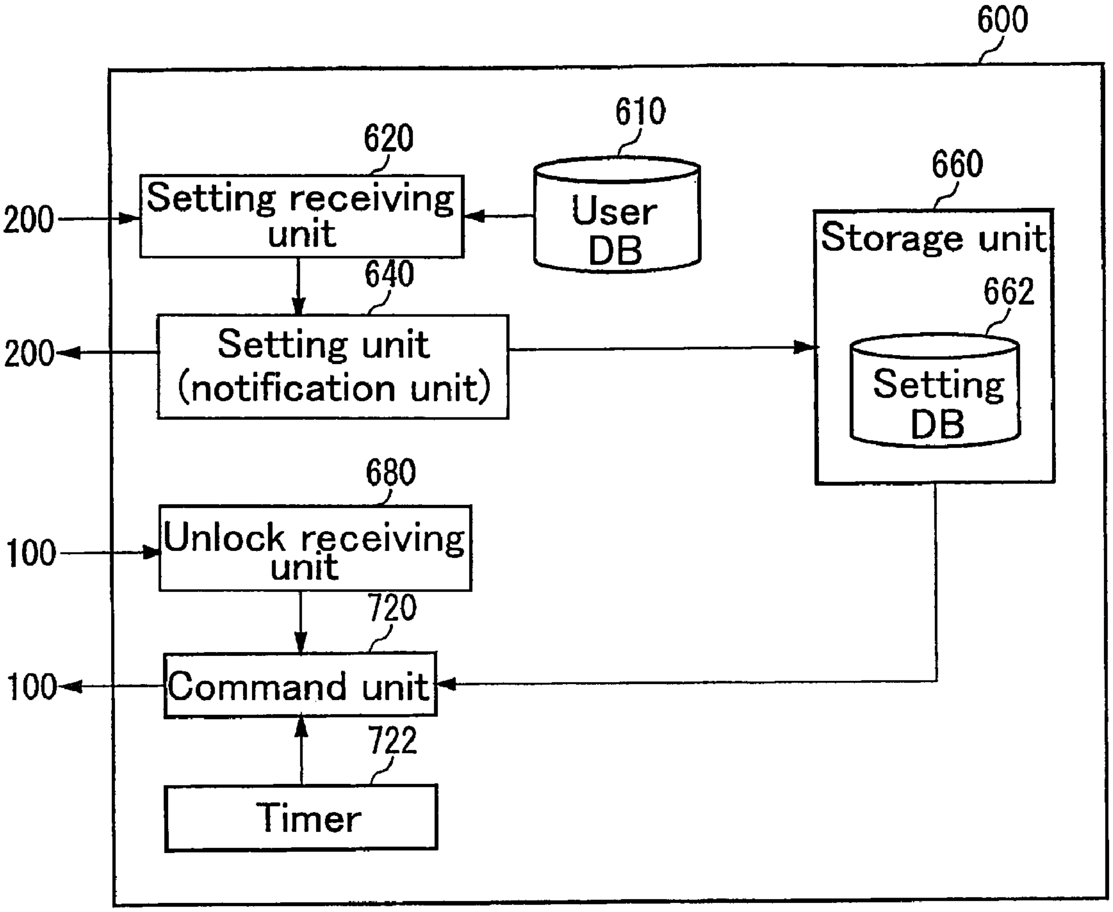
FIG. 7 is a block diagram showing an example of the configuration of a management device.

FIG. 7 shows an example of the configuration of the management device 600 of the present embodiment. As a data storage unit, the management device 600 includes a user database 610 and a setting database 662, and as a functional unit, includes a setting receiving unit 620, a setting unit 640, a storage unit 660, a unlock receiving unit 680, a timer 722, and a command unit 720. Note that the setting unit 640 is also used as a notification unit of the present invention.

The user database 610 stores various types of user data. The user database 610 will associate at least a user ID with the presence or absence of a right to use a locker 100, and store the same.

The setting database 662 stores various types of data relating to the lockers 100.

The setting receiving unit 620 receives a user ID from the input device 200. Then, the setting receiving unit 620 will query the user database 610 as to whether or not that user has been granted use rights for the lockers 100. If use rights have been granted, then the user ID will be output to the setting unit 640. In addition, when a password received from the input device 200 is associated with a locker ID, the setting receiving unit 620 will output the received password and the locker ID to the setting unit 640.

When a user ID is received from the setting receiving unit 620, the setting unit 640 will query the storage unit 660 for unused lockers 100 and extract them, and then will transmit the locker IDs of the extracted lockers 100 to the input unit 200. In addition, when a password associated with a locker ID is received from the setting receiving unit 620, the setting unit 640 will assign the locker 100 corresponding to the received locker ID to the user, i.e., to the recording device 400. Then, an electronic key will be randomly generated, and the generated electronic key will be set as the electronic key for the locker 100 identified by the received locker ID. Then, the setting unit 640 will transmit the set electronic key to the input device 200, and will store the associated locker ID and password in the storage unit 660.

The storage unit 660 will store various data relating to the lockers 100 in the setting database 662.

The unlock receiving unit 680 will receive the associated electronic key, password, and (depending on the situation) the locker ID. Then, the received data will be output to the command unit 720.

The timer 722 will output the received data to the command unit 720 at a predetermined time, e.g., every day at 23:30.

The command unit 720 will confirm whether or not the received electronic key and password combination matches the combination stored in the storage unit 660. Here, if all of the locker IDs are received together, confirmation can be performed quickly and reliably. Then, if there is a match, the command unit 720 will output an unlock command to the locker 100 having that combination. In addition, when the command unit 720 receives notification from the timer 722 that the predetermined time has arrived, the command unit 720 will output an unlock command to all of the lockers 100. This makes it easy to manage the contents of the lockers 100.

FIG. 8 shows an example of the configuration of the data stored in the setting database 662 of the present embodiment in table format. In the present embodiment, the setting database 662 includes a table for each locker 100. Each table stores the electronic key set by the setting unit 640, the password received by the setting receiving unit 620, and the usage history of the locker 100. The user ID, the time in which usage began, and the time in which usage was completed, are stored as the usage history.

By storing the usage history in the setting database 662, one can verify whether a particular user has used the locker 100. Thus, even if an item is inadvertently left in one of the lockers 100, the owner of that article can be easily identified.

Figure 9:
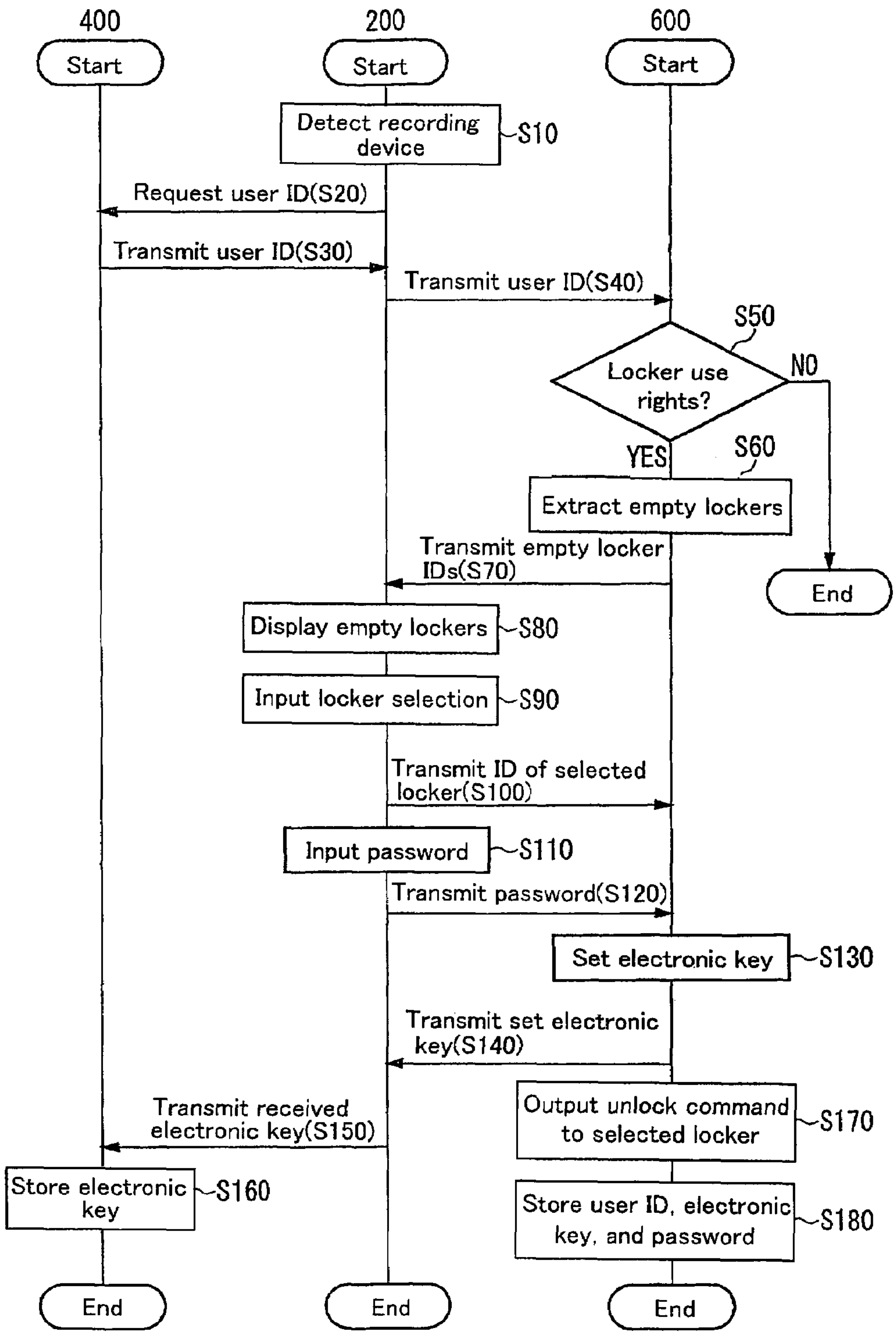
FIG. 9 is a flowchart showing the operation of the electronic locking system according to the first embodiment when a locker and electronic data for the locker are assigned to a user.

FIG. 9 shows one example of the operation of the electronic locking system of the present embodiment. The operation described in this example is when a locker 100 and an electronic key for the locker 100 is to be assigned to a user. It is assumed that the user is carrying the recording device 400. If, for example, the lockers 100 are installed in a changing room, the recording device 400 may be given to the user after a user ID is stored therein at the reception desk of the changing room. In addition, the user may already be in possession of the recording device 400. In this situation, the user will inform the reception desk of his or her user ID.

The reception desk will confer user rights for a locker 100 in the user database 610 of the management device 600 to this user ID, and will store the user ID in the recording device 400.

First, when the user approaches the locker 100, the input device 200 will detect the approach of the recording device 400 (Step S11), and will request the user ID from the recording device 400 (Step S20). The recording device 400 will transmit the user ID to the input device 200 (Step S30). The input device 200 will transmit the received user ID to the management device 600 (Step S40).

The management device 600 will query the user database 610 to confirm whether user rights to a locker 100 have been conferred to the received user ID (Step S50). When user rights have been conferred to the user ID (Step S50: Yes), the management device 600 will select the locker IDs of the lockers 100 that are empty (Step S60), and will transmit the locker IDs to the input device 200 (Step S70).

The input device 200 will display the lockers 100 corresponding to the received locker IDs in a manner which will allow the user to identify them (Step S80). Then, when the selection of a locker 100 is input by the user (Step S90), the locker ID corresponding to the selected locker 100 will be transmitted to the management device 600 (Step S100). When a password is input by the user (Step S110), the password will be transmitted to the management device 600 (Step S120). When the management device 600 receives the locker ID and the password, the management device 600 will set the electronic key (Step S130), and transmit the electronic key to the input device 200 (Step S140).

The input device 200 will transmit the received electronic key to the recording device 400 (Step S150), and cause the electronic key to be stored therein (Step S160).

In addition, the management device 600 will output an unlock command to the locker 100 corresponding to the received locker ID in order to open the locker 100 (Step S170), and will store the user ID, electronic key, and password associated with the locker ID (Step S180).

Thus, the electronic locking system of the present invention can provide an electronic key to a user without placing a burden on him or her. In addition, a user can select the locker 100 that he or she desires.

Figure 10:
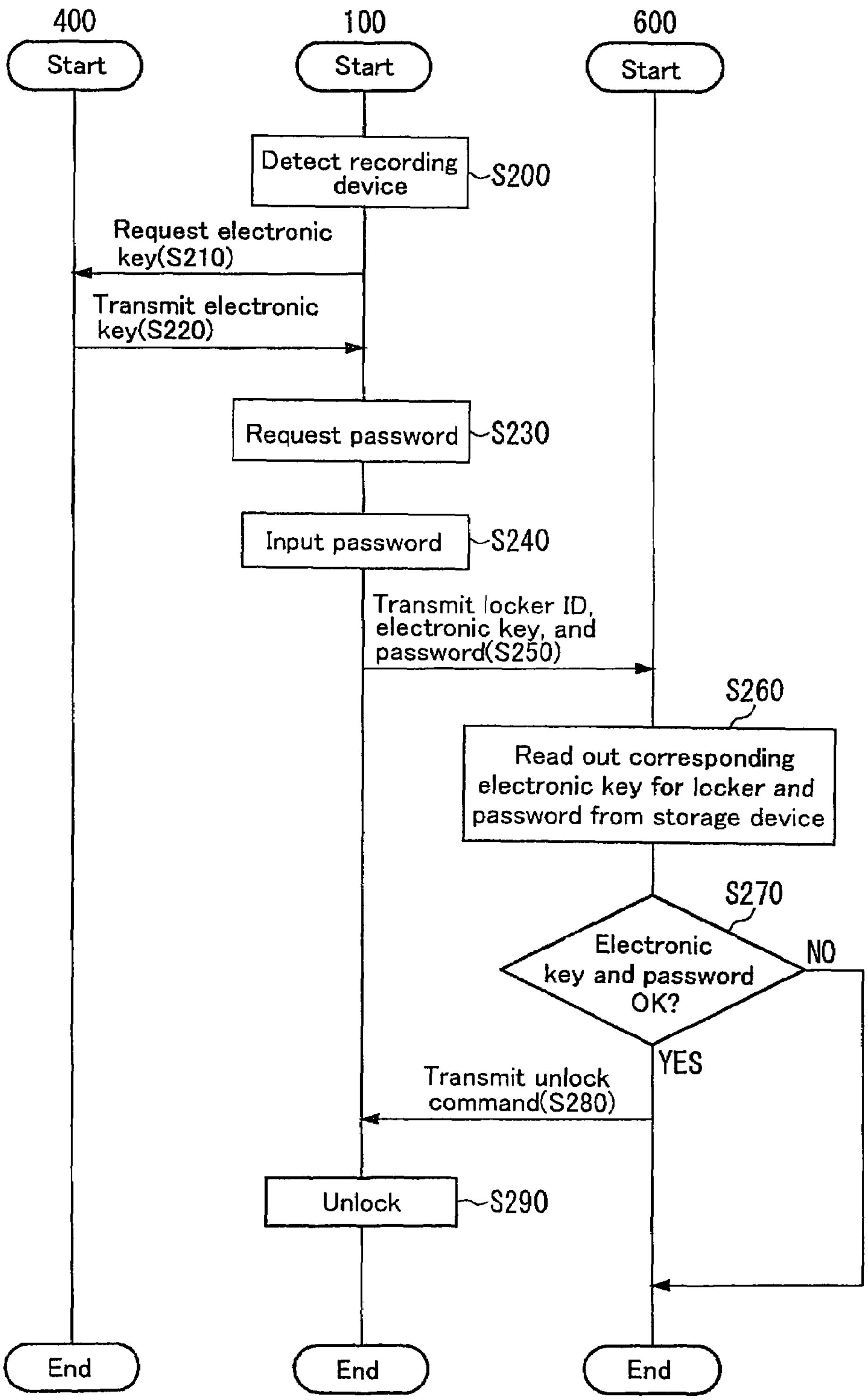
FIG. 10 is a flowchart showing the operation of the electronic locking system of the first embodiment when a user is to open the locker.

FIG. 10 shows another example of the operation of the electronic locking system of the present embodiment. The operation described in this example is when a user is to open a locker 100.

When the locker 100 detects the approach of the recording device 400 (Step S200), the locker 100 will request the electronic key from the recording device 400 (Step S210). The recording device 400 will transmit the electronic key to the locker 100 in response to this request (Step S220). Then, the locker 100 will request the user to input a password (Step S230). When the password is input, the locker 100 will associate the locker ID, the electronic key, and the password, and transmit these to the management device 600 (Step S250).

The management device 600 will read out the electronic key and password associated with the locker ID from the setting database 662 (Step S260), and will confirm whether there is a match with the received electronic key and password (Step S270).

If there is a match (Step S270: Yes), the management device 600 will transmit an unlock command to the locker 100 (Step S280), which will cause the locker 100 to open (Step S290).

Thus, the electronic locking system of the present invention will improve safety, because both a password randomly set by a user, and an electronic key assigned by the management device 600, will be needed to open a locker 100. Here, a user will not feel burdened because only a password will be input.

Figure 11:
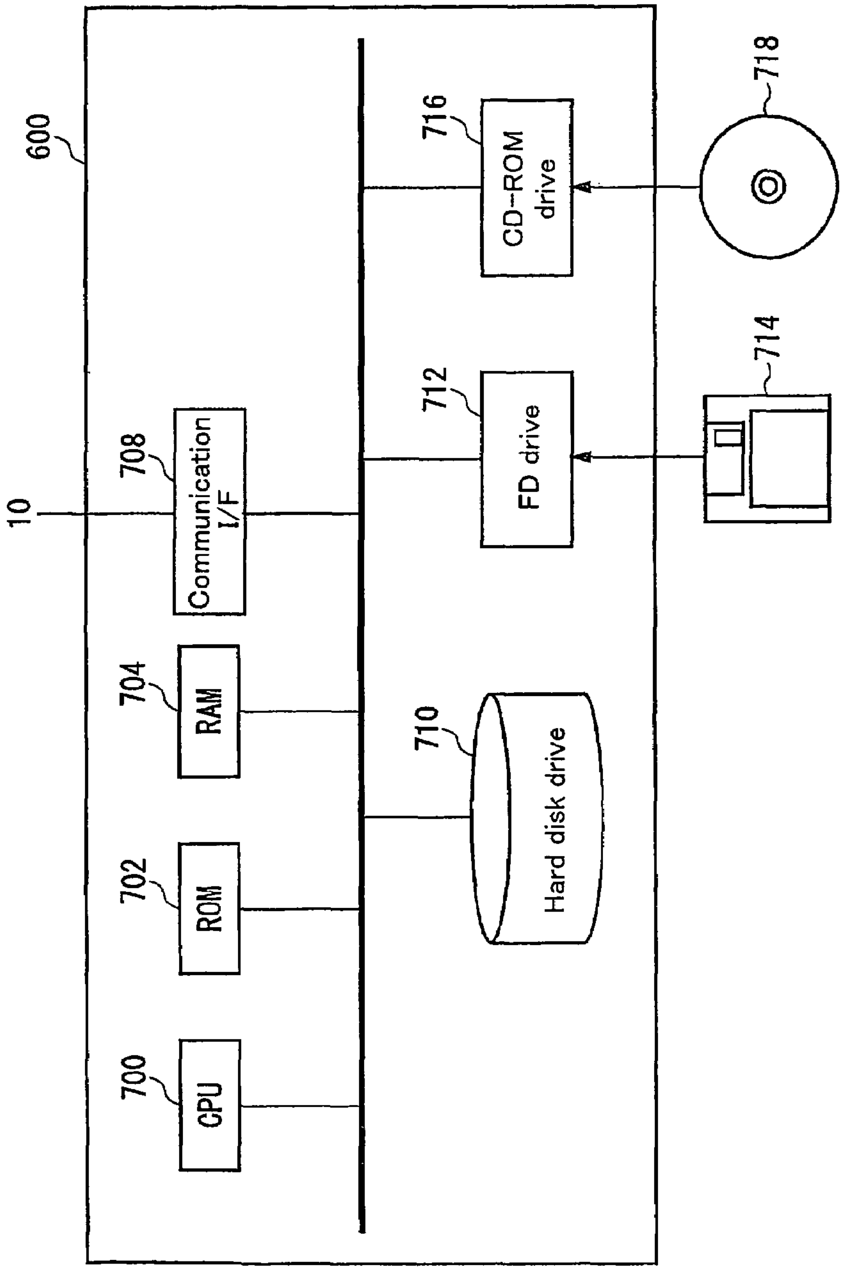
FIG. 11 is a block diagram showing the hardware configuration of the management device.

FIG. 11 is a block diagram showing the hardware configuration of the management device 600. The management device 600 includes a CPU 700, a ROM 702, a RAM 704, and a communication interface 708. The CPU 700 operates based upon a program stored in the ROM 702 and RAM 704. The communication interface 708 communicates with the lockers 100 and the input device 200 via the communications network 10. A hard disk drive 10 (an example of a storage device) stores setting data and the program that operates the CPU 700.

A flexible disk drive 712 will read data or programs from a flexible disk 714 and provide these to the CPU 700. A CD-ROM drive 716 will read data or programs from a CD-ROM 718 and provide these to the CPU 700. The communication interface 708 is connected to the network 10 in order to transmit and receive data.

Software that executes the CPU 700 is stored on a storage medium such as the flexible disk 714 or the CD-ROM 718 supplied to a user. The software stored on the storage medium may be compressed or decompressed. The software is installed from the storage medium to the hard disk drive 710, and is read out to the RAM 704 in order to be executed by the CPU 700.

The functional configuration of the software stored and provided on the storage medium, i.e., the software that is installed in the hard disk drive 710, includes a setting reception module, a determination module, a storage module, an open lock reception module, and a selection module. A description of the processes by which each of these modules effect a computer and are performed by the CPU 700 will be omitted, because they are the same as the function and operation of the corresponding portions of the management device 600 of the first embodiment of the present invention.

2. Second Embodiment

An electronic locking system according to a second embodiment of the present invention is generally the same as that of the first embodiment, however the configuration of the lockers 100 and the management device 600 are different.

Figure 12:
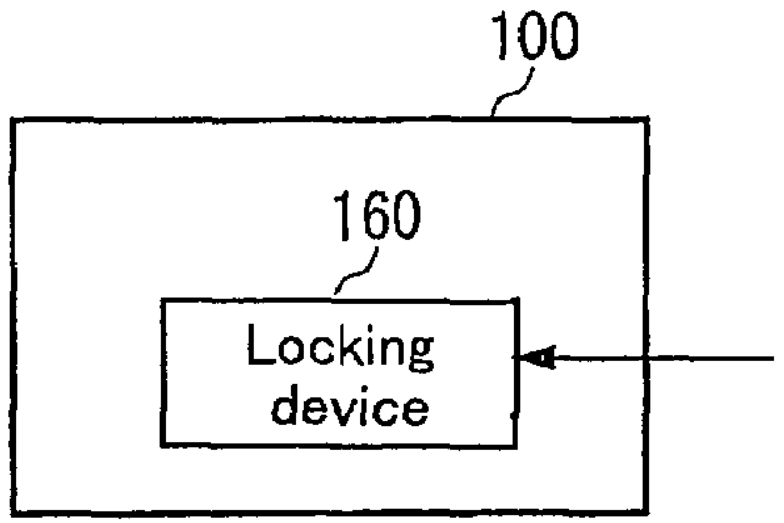
FIG. 12 is a block diagram that shows a sample configuration of the locker according to the second embodiment.

FIG. 12 shows the configuration of a locker 100 according to the second embodiment. The locker 100 in this embodiment has only a locking unit 160.

Figure 13:
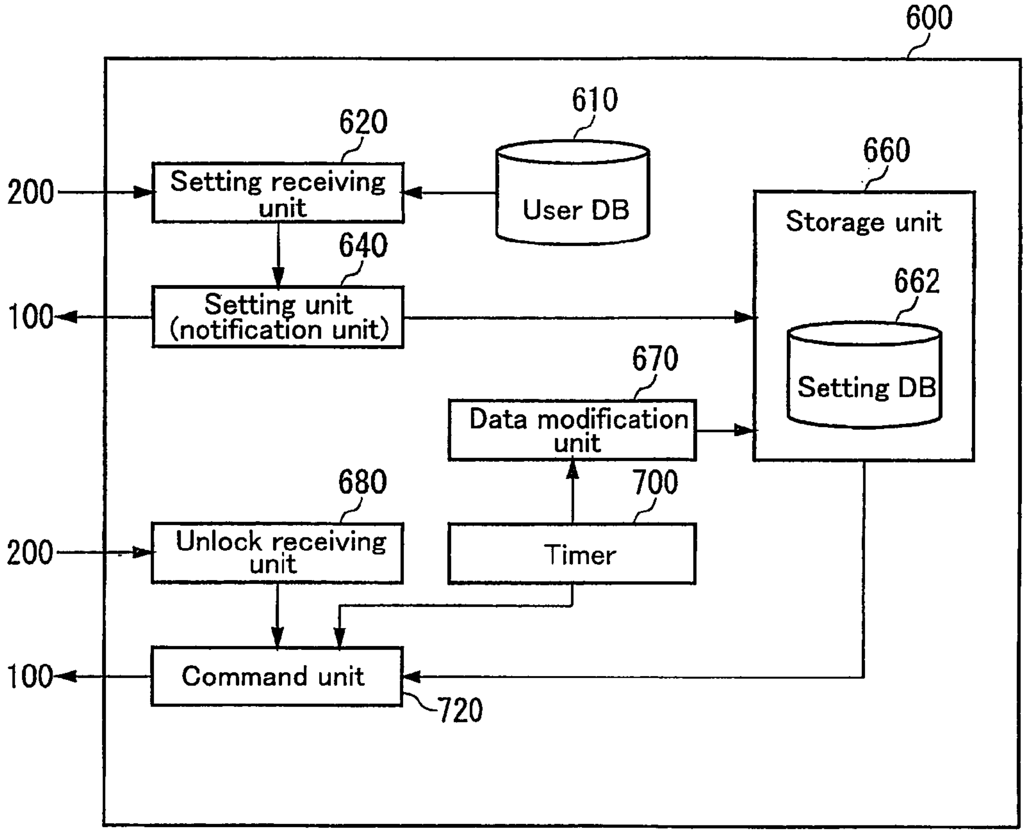
FIG. 13 is a block diagram that shows a sample configuration of the management device according to the second embodiment.

FIG. 13 shows an example of the configuration of the management device 600 according to the second embodiment. In the management device 600 of this embodiment, the unlock receiving unit 680 communicates with the input device 200, and the management device 600 includes a data modification unit 670.

The data modification unit 670 will set and assign in advance an electronic key for each locker 100, and will store them in the setting database 662. Then, the data modification unit 670 will periodically modify the electronic keys in accordance with a command from the timer 722, and update the setting database 662.

The operation of assigning a locker 100 and an electronic key for the locker 100 to a user in the electronic locking system according to the second embodiment is generally the same as that of the electronic locking system according to the first embodiment. However, in Step S130 of FIG. 9, the setting unit 640 will determine the electronic key to be transmitted by selecting and reading the electronic key corresponding to the locker ID received from the setting receiving unit 620.

Figure 14:
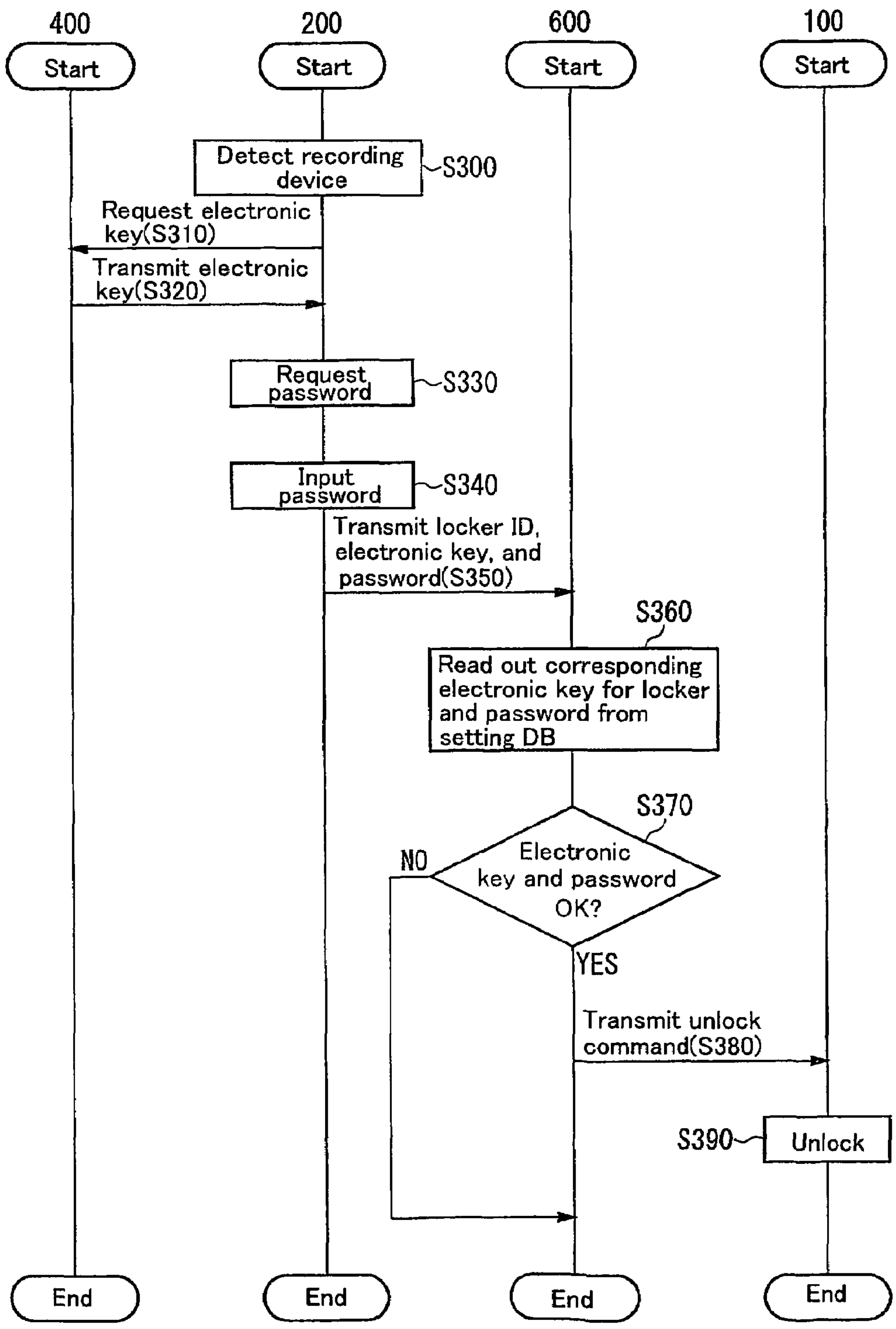
FIG. 14 is a flowchart showing the operation of the electronic locking system of the second embodiment when a user is to open the locker.

FIG. 14 shows the operation of the electronic locking system according to the second embodiment. The operation described in this example is when a user is to open a locker 100.

When the input device 200 detects the approach of the recording device 400 (Step S300), the input device 200 will request the electronic key from the recording device 400 (Step S310). The recording device 400 will transmit the electronic key to the input device 200 in response to this request (Step S320). Then, the input device 200 will request the user to input a password (Step S330). When the password is input, the input device 200 will associate the locker ID, the electronic key, and the password, and transmit these to the management device 600 (Step S350).

The management device 600 will read out the electronic key and password associated with the locker ID from the setting database 662 (Step S360), and will confirm whether there is a match with the received electronic key and password (Step S370).

If there is a match (Step S370: Yes), the management device 600 will transmit an unlock command to the locker 100 (Step S380), which will cause the locker 100 to open (Step S390).

Thus, with this electronic locking system, a user can perform all input with the input device 200.

In addition, the hardware configuration of the management device 600 according to the second embodiment is generally the same as that of the first embodiment, and thus the details thereof will be omitted. However, the functional configuration of the software that executes the CPU 700 includes a setting reception module, a determination module, a storage module, an open lock reception module, a selection module, and a data modification module. A description of the processes by which each of these modules effect a computer and are performed by the CPU 700 will be omitted, because they are the same as the function and operation of the corresponding portions of the management device 600 of the second embodiment of the present invention.

3. Third Embodiment

Figure 15:
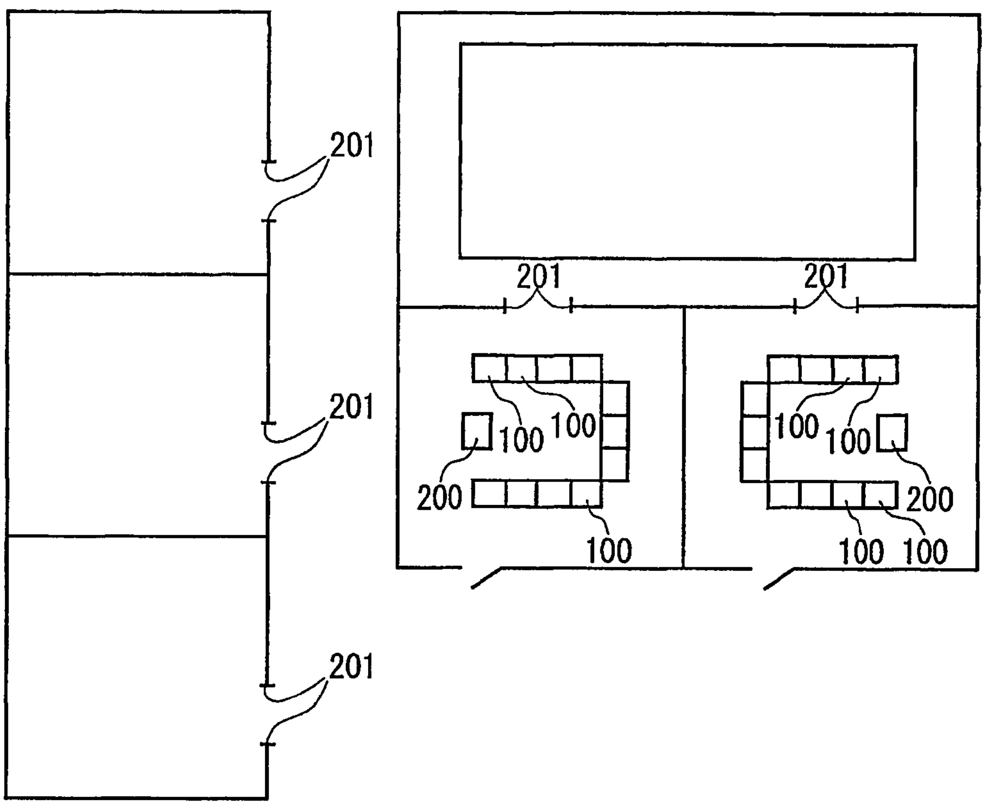
FIG. 15 is a block diagram that shows an example of the electronic locking system according to a third embodiment.

FIG. 15 shows an example the usage of an electronic locking system according to a third embodiment of the present invention.

Figure 16:
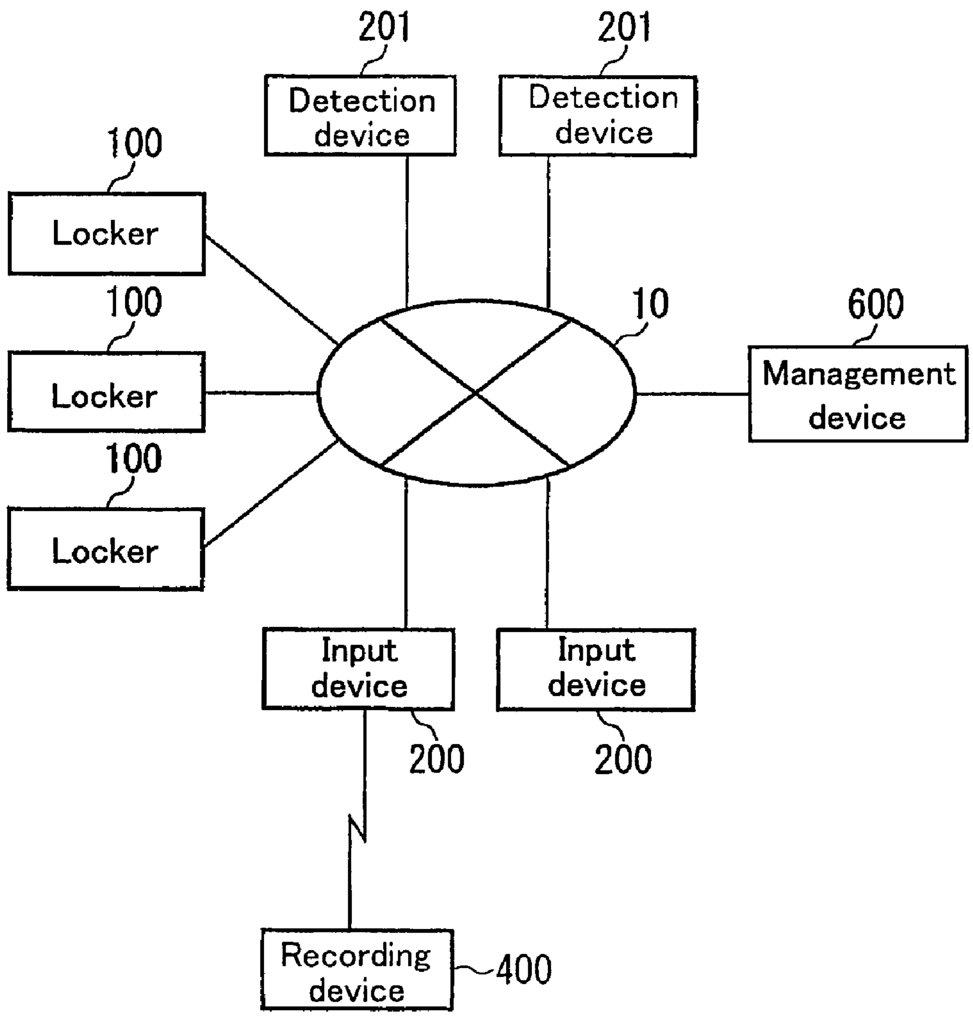
FIG. 16 is a block diagram that shows a sample configuration of the electronic locking system according to the third embodiment.

FIG. 16 shows an example of the configuration of the electronic locking system of the present embodiment.

The electronic locking system of this embodiment can be employed in sports gyms, for example. The electronic locking system of the present embodiment is generally the same as the electronic locking system according to the first embodiment, but the configuration of the management device 600 is different, and further includes detection devices 201. The detection devices 201 are installed in each entrance to each facility of the sports gym, such as a studio or a pool, and will detect the recording device 400 of each user that passes through the entrances. In other words, the electronic locking system of this embodiment will manage the lockers 100, and will manage the plurality of users of each facility.

Figure 17:
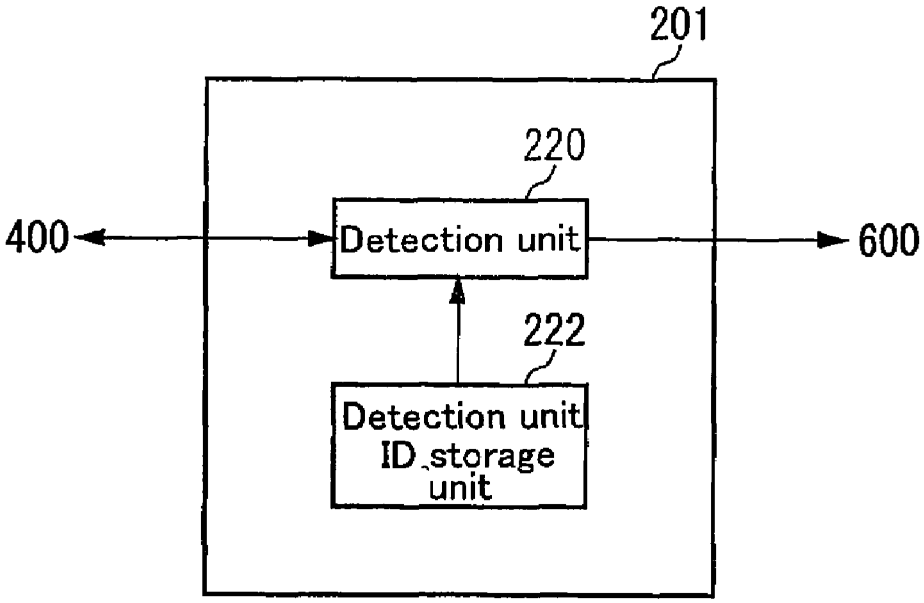
FIG. 17 is a block diagram that shows an example of the functional configuration of detection device.

FIG. 17 shows the functional configuration of a detection device 201. In the present embodiment, the detection device 201 includes a recording device detection unit 220, and a detection unit IUD storage unit 222.

The recording device detection unit 220 has generally the same function as that of the recording device detection unit 220 of the input device 200. However, the recording device detection unit 220 here will associate the detection unit ID stored in the detection unit ID storage unit 222 with the received user ID, and output this to the management device 600. Here, the detection unit ID is data which will identify the detection unit 201.

Figure 18:
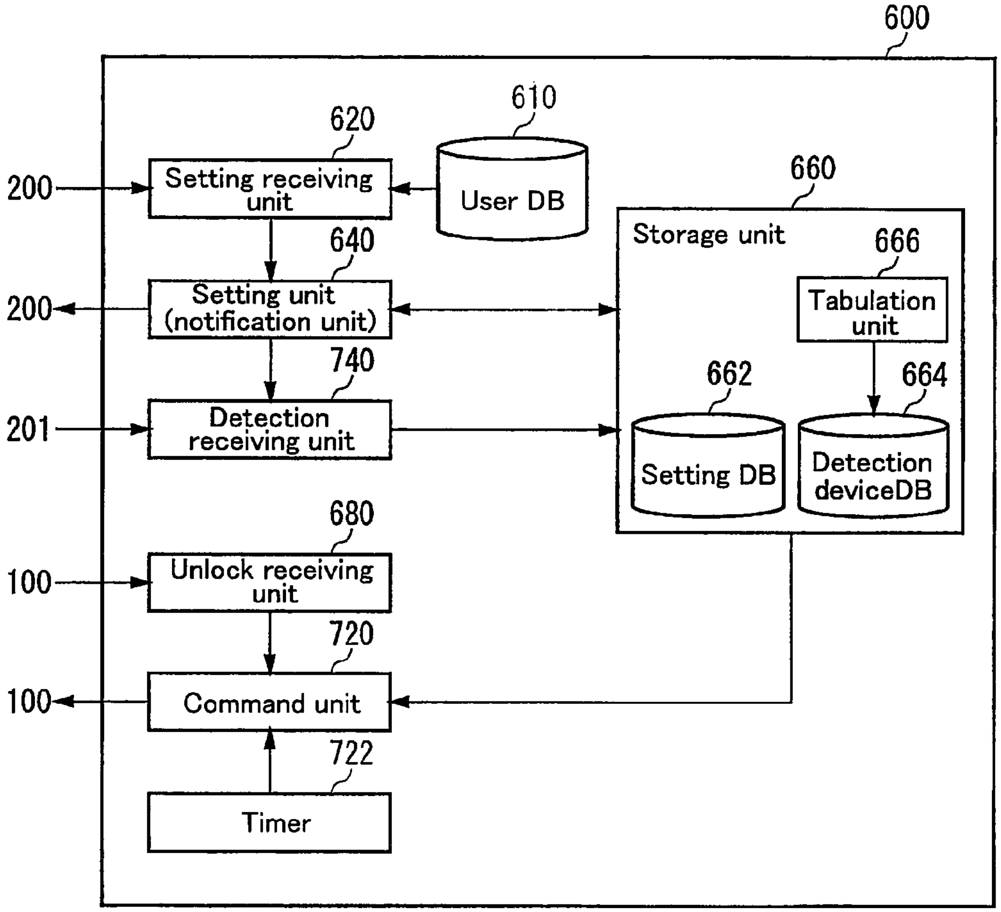
FIG. 18 is a block diagram that shows a sample configuration of the management device according to the third embodiment.

FIG. 18 shows an example of the configuration of the management device 600 according to the third embodiment. The management device 600 according to this embodiment has generally the same configuration as the management device 600 according to the first embodiment, but differs therefrom with respect to the presence of a detection receiving unit 740, and the functional configuration of the storage unit 660. In addition to the configuration of the storage unit 660 according to the first embodiment, the storage unit 660 here further has a detection device database 664 and a tabulation unit 666.

The detection device database 664 will store user IDs detected by the detection devices 201.

The detection receiving unit 740 will receive detection unit IDs and user IDs from the detection devices 201, and output this data to the storage unit 660.

When the storage unit 660 receives a detection unit ID and a user ID from the detection receiving unit 740, the storage unit 660 will confirm whether or not the user ID that corresponds with the detection unit ID is stored in the detection unit database 664.

In the event that the user ID is not stored therein, the user ID will be associated with the detection unit ID and stored. More specifically, the user ID may be added to the detection unit database 664, or may be flagged therein.

In the event that a user ID that is already stored therein is detected again, it will be determined that the user has departed that facility, and the time of departure will be recorded. Note that the storage unit 660 may delete the user IDs, or may delete the flags thereto. If the user IDs are not deleted, the detection unit database 664 will manage the total number of entrants for each facility.

Although entrance times for each user ID are not stored in the detection device database 664, the tabulation unit 666 may tabulate for each detection device 201 the number of user IDs for which the departure time is not stored. The number of entrants to the facilities where the detection devices 201 are installed will be stored in the recording device database 664. The tabulation unit 666 may perform the aforementioned operation every 10 minutes, for example, and may perform the aforementioned operation each time the detection device database 664 is updated. In addition, in the event that the storage unit 660 deletes the user IDs of departed users, the tabulation unit 666 may tabulate the number of user IDs associated with each detection device 201 in the detection device database 664.

FIG. 19 shows an example of the data configuration of the detection device database 664 in table format. In the present embodiment, the detection device database 664 includes a table for each detection unit. Each table stores a detection unit ID, a location, the number of persons, and the user IDs. Furthermore, each table stores the time at which a user ID was detected as the entrance time. In addition, in the event that a user ID that is already stored therein is detected again, it will be determined that this user has departed that facility, and the time at which that detection occurred will be stored as the departure time. Thus, the management device 600 shown in this embodiment can be used to determine which user used which facility for what amount of time.

Figure 20:
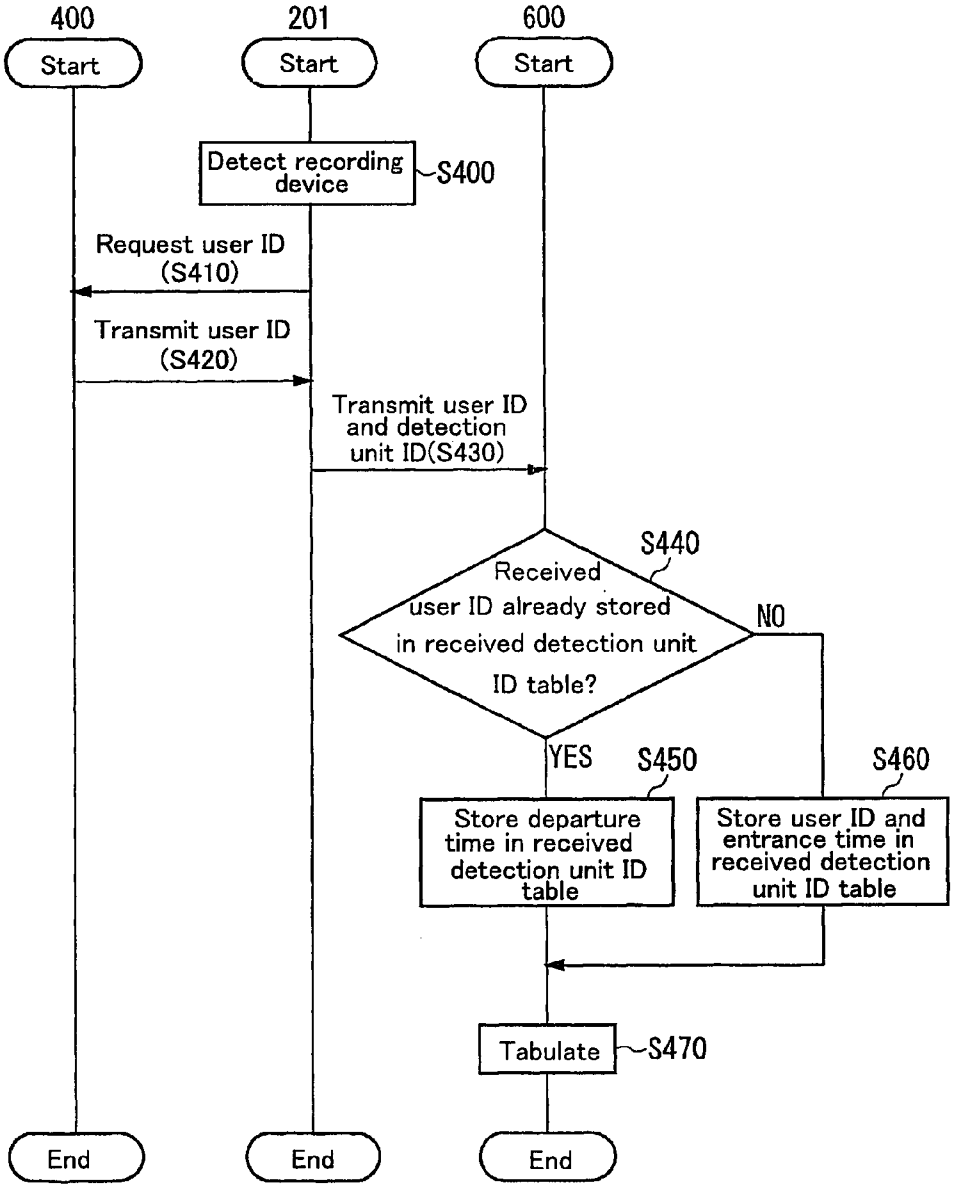
FIG. 20 is a flowchart that shows the operation of the electronic locking system when a user enters a facility or departs from a facility.

FIG. 20 shows the operation of the electronic locking system according to the third embodiment. The operation of the electronic locking system of this embodiment is when a user enters a facility or departs from a facility.

When a detection device 201 detects a recording device 400 (Step S400), the detection device 200 will request the user ID from the recording device 400 (Step S410). The recording device 400 will transmit the user ID to the detection device 201 (Step S420). The detection device 201 will output the received user ID and the detection unit ID to the management device 600 (Step S430).

In the event that the received user ID is already stored in the received detection unit ID table (Step S440: Yes), the management device 600 will store the time at which the user ID was detected in the detection unit ID table as the departure time of the user (Step S450). In addition, in the event that the received user ID is not stored in the received unit ID table (Step S440: No), the management device 600 will store the user ID in the detection unit ID table, and will store the time at which the user ID was detected as the time at which the user entered the facility (Step S460).

Then, the management device 600 will tabulate the number of entrants (Step S470).

Thus, the electronic locking system of third embodiment can manage the number of entrants for each facility.

Note that the other operations of the electronic locking system according to the third embodiment is generally the same as that of the first embodiment, and thus the details thereof will be omitted.

In addition, the hardware configuration of the management device 600 according to the third embodiment is generally the same as that of the first embodiment, and thus the details thereof will be omitted. However, the functional configuration of the software that executes the CPU 700 includes a setting reception module, a determination module, a storage module, an open lock reception module, a selection module, and a detection reception module. In addition, the storage unit 660 includes a tabulation module as a sub-module. A description of the processes by which each of these modules effect a computer and are performed by the CPU 700 will be omitted, because they are the same as the function and operation of the corresponding portions of the management device 600 of the third embodiment of the present invention.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

For example, a configuration is possible in which, instead of allowing a user to select a locker, a locker will be automatically assigned to a user. This configuration is one in which Steps S80, S90, and S100 of FIG. 9 will be omitted, and in Step S60, the setting unit 640 of the management device 600 will assign a locker 100 to a user. In other words, by simply inputting a password in the input device 300, a user will be assigned a locker 100, and an electronic key for opening the assigned locker 100 can be obtained. Here, if the password input and transmission, i.e., Steps S110 and S120, are also omitted, the user can be assigned a locker 100, and can obtain an electronic key for opening the assigned locker 100, by simply approaching a locker 100.

In addition, the recording device 400 may store the recording device ID of the recording device 400 instead of a user ID, and then transmit the recording device ID to the input device 200. With this configuration, the input device will output the recording device ID to the management device 600. The management device 600 will associate and store the user ID and the recording device ID. This configuration will operate in the same manner as that described above.

Furthermore, a configuration is possible in which instead of the password being input in the input device 200, the password will be input in a locker 100 after an electronic key thereto is delivereed to the recording device 400.

In addition, a configuration is also possible in which the management device 600 will assign a locker 100 and transmit the electronic key, and complete the transaction with respect to the use of the locker 100. In all of the aforementioned configurations, the electronic locking system of the present invention is not limited to lockers.

This application claims priority to Japanese Patent Application No. 2002-89360 and PCT Application No. PCT/JP03/03799. The entire disclosure of Japanese Patent Application No. 2002-89360 and PCT Application No. PCT/JP03/03799 are hereby incorporated herein by reference.

What is claimed is:

1. An electronic locking system, comprising:

a locking device that is unlocked by inputting electronic data therein;

a portable recording device that externally receives and stores electronic data;

a plurality of recording device detection units placed in mutually different locations, each of the recording device detection units configured to detect the recording device without coming into contact therewith, and output detection unit identification data that identifies one recording device detection unit from another recording device detection unit when the recording device is detected;

a setting unit that sets electronic data that is to be transmitted to the recording device detected by the recording device detection unit;

a transmission unit that wirelessly transmits the electronic data set by the setting unit to the recording device; and a storage unit that stores data that specifies, for each recording device detection unit, the number of times the recording device detection unit outputted the detection unit identification data.

2. The electronic locking system set forth in claim 1, wherein the setting unit sets electronic data to be transmitted to the recording device on condition that one of the plurality of recording device detection units has detected the recording device.

3. The electronic locking system set forth in claim 2, wherein the electronic locking system manages a plurality of locking devices; and further comprising a storage unit that associates the electronic data set by the setting unit with the locking device that will be unlocked with the electronic data, and stores the same.

4. The electronic locking system set forth in claim 1, wherein the electronic locking system manages a plurality of locking devices; and further comprising a storage unit that respectively associates a plurality of electronic data with the plurality of locking devices;

wherein the setting unit will set the electronic data to be transmitted from the storage unit by selecting one of the locking devices and the electronic data that corresponds to that one locking device.

5. The electronic locking system set forth in claim 4, further comprising a data modification unit that modifies at least a portion of the electronic data stored in the storage unit at predetermined periods of time.

6. The electronic locking system set forth in claim 1, further comprising a storage unit that stores the electronic data transmitted by the transmission unit;

an unlock receiving unit that receives the electronic data that is stored in the recording device when the locking device is to be unlocked; and a command unit that outputs an unlock command to the locking device and causes the locking device to unlock on condition that the electronic data received by the unlock receiving unit matches the electronic data stored in the storage unit.

7. The electronic locking system set forth in claim 6, further comprising a setting receiving unit that receives a password set by a user for the locking device;

wherein the storage unit stores the password received by the setting receiving unit;

the unlock receiving unit receives the password when the password is input in order to open the locking device, and associates the password with the electronic data; and the command unit outputs the unlock command on condition that there is a match between both the password and the electronic data received by the unlock receiving unit.

8. The electronic locking system set forth in claim 7, wherein the setting receiving unit receives user identification data that identifies a user from other users; and the storage unit stores the user identification data received by the setting receiving unit.

9. The electronic locking system set forth in claim 8, wherein the unlock receiving unit receives the password input in order to unlock the locking device, the electronic data, and the user identification data; and the command unit will output an unlock command to the locking device on condition that the user identification data, the password, and the electronic data received by the unlock receiving unit matches the data stored in the storage unit.

10. The electronic locking system set forth in claim 8, wherein the recording device further stores a history of the user identification data input with the locking device.

11. The electronic locking system set forth in claim 6, further comprising a setting receiving unit that receives user identification data that identifies a user of the locking device from other users;

wherein the storage unit stores the user identification data received by the setting receiving unit;

the unlock receiving unit receives the user identification data, and associates the user identification data input in order to open the locking device with the electronic data; and the command unit outputs the unlock command on condition that there is a match between both the user identification data and the electronic data received by the unlock receiving unit.

12. The electronic locking system set forth in claim 11, wherein the recording device further stores a history of the user identification data input with the locking device.

13. The electronic locking system set forth in claim 1, wherein one of the plurality of recording device detection units and the transmission unit are arranged in a location that is near where the locking device is located.

14. The electronic locking system set forth in claim 1, further comprising a command unit that will output an unlock command to the locking device and cause the locking device to unlock on condition that the transmission unit has transmitted the electronic data.

15. The electronic locking system set forth in claim 1, further comprising a command unit that will output an unlock command to the locking device and cause the locking device to open at a predetermined timing.

16. The electronic locking device set forth in claim 1, wherein each recording device detection unit is placed in entrances of mutually different facilities;

each recording device detection unit outputs data that identifies the recording device and the detection unit identification data, so as to cause data to be stored in the storage unit that indicates that the user that is in possession of the recording device has passed through an entrance of a facility in which the recording device detection unit is placed;

in the event that data that identifies a new recording device is output from one of the recording device detection units, the storage unit will determine that a new user has entered the facility, will store and associate the data identifying the recording device with the detection unit identification data, and will store the time at which the recording device detection unit has output the detection unit identification data as the user's entrance time; and in the event that data that identifies a previously stored recording device is output by the recording device detection unit, the storage unit will determine that the user has departed the facility, and will store and associate the time at which the recording device detection unit has output the detection unit identification data with the data identifying the previously stored recording device, and store the time as the time at which the user has departed the facility.

17. The electronic locking device set forth in claim 1, wherein at least one of the recording device detection units receives from the recording device both the detection unit identification data, and recording device identification data that specifies the recording device; and the storage unit stores, for each recording device detection unit, the recording device identification data as data that specifies the number of times the recording device detection unit outputted the detection unit identification data.

18. The electronic locking device set forth in claim 17, wherein when the storage unit receives a previously stored detection unit identification data and recording device identification data combination, the storage unit will delete the recording device identification data.

19. The electronic locking device set forth in claim 18, further comprising a tabulation unit that tabulates the number of recording device identification data associated with one detection unit identification data.

20. The electronic locking system set forth in claim 1, wherein the electronic locking system manages a plurality of locking devices currently in use; and the setting unit extracts the locking devices not currently in use, and sets one of the unused locking devices to be assigned to the recording device, on condition that one of the plurality of recording device detection units has detected the recording device.

21. A locking management device that manages a locking device that is unlocked by inputting electronic data therein, the locking management device comprising:

a setting receiving unit that receives, from a plurality of recording device detection units that detect a portable recording device that receives electronic data from the exterior of the recording device and stores the same, both detection unit identification data that identifies the recording device detection units, and data indicating that the recording device has been detected;

a setting unit that sets the electronic data to be transmitted to the recording device in the event that the setting receiving unit has received both predetermined detection unit identification data and the recording device detection data;

an output unit that outputs the electronic data set by the setting unit to the exterior of the locking management device in order to be stored in the recording device;

a detection receiving unit that receives, from at least one of the recording device detection units, recording device identification data that identifies the recording device, and the detection unit identification data that indicates the at least one recording device detection unit; and a storage unit that associates the recording device identification data received by the detection receiving unit with the recording device detection unit and stores the same.

22. The locking management device set forth in claim 21, wherein when the storage unit has received the electronic data previously associated with the at least one detection unit identification data, the storage unit will delete the electronic data.

23. The locking management device set forth in claim 22, further comprising a tabulation unit that tabulates the number of electronic data associated with the at least one detection unit identification data.

24. A computer executable program stored on a storage device of a computer for managing a locking device that is unlocked by inputting electronic data therein, the program causing the computer to:

receive from a plurality of recording device detection units that detect a portable recording device that receives electronic data from the exterior of the plurality of recording device detection units and stores the same, both detection unit identification data that identifies the recording device detection units, and data indicating that the recording device has been detected;

set the electronic data to be transmitted to the recording device when the setting receiving unit has received both predetermined detection unit identification data and the recording device detection data;

output the set electronic data to the exterior of the plurality of recording device detection units in order to be stored in the recording device;

receive from at least one of the plurality of recording device detection units, recording device identification data that identifies the recording device, and the detection unit identification data that indicates the at least one recording device detection unit; and associate and store the received recording device identification data with the recording device detection unit.

25. An electronic locking system, comprising:

a plurality of locking devices that are each unlocked by inputting electronic data therein;

a portable recording device that externally receives and stores electronic data;

a recording device detection unit that detects the recording device without coming into contact therewith;

a setting unit that sets electronic data that is to be transmitted to the recording device detected by the recording device detection unit;

a transmission unit that wirelessly transmits the electronic data set by the setting unit to the recording device;

a storage unit that respectively associates a plurality of electronic data with the plurality of locking devices; and a data modification unit that modifies at least a portion of the electronic data stored in the storage unit at predetermined periods of time;

wherein the setting unit will set the electronic data to be transmitted from the storage unit by selecting one of the locking devices and the electronic data that corresponds to that one locking device.

* * * * *